Patented May 10, 1938

2,116,977

UNITED STATES PATENT OFFICE 2,116,977

FLUORESCENT LAMP

Clemens A. Laise, Tenafly, N. J.

No Drawing. Application September 4, 1937,
Serial No. 162,525

5 Claims. (Cl. 176—122)

This invention relates to new and useful improvements in fluorescent lamps, and more particularly to translucent or transparent lamp envelopes, such as tubing or bulbs coated with fluorescent materials, and methods of preparing and applying such materials to lamp envelopes.

In accordance with the present invention the tubing, bulb or the like, is coated on the inside with a crystalline fluorescent material having sharp corners and edges. The fluorescent particles are bonded to the lamp envelope without covering the crystal surfaces by a coating of the bonding agent. When such sharp cornered fluorescent particles are exposed to activating agents such as cathode rays, ultra-violet light and the like, then striking effects will be produced, far more so than is the case with structures in which the particles are rounded or covered by the bonding material.

Glass tubing coated in accordance with the present invention may be bent, heated and spliced without ill effects.

The fluorescent materials are crystallized during or after their production, preferably by heating until minute crystalline particles are formed. If the particles tend to adhere to one another, then they are carefully crushed so as to disrupt the crystals as little as possible, and they are then put through a sieve of between 100 and 350 mesh, preferably about 200 mesh in fineness.

For my fluorescent materials I prefer to use a base of silica, either as chemically pure silica or the purest grade of infusorial earth or diatomaceous earth, which is very porous and absorbent. This is then treated with a material which it will readily absorb, such as zinc oxide, and an activating material such as a manganese salt. The resultant product when heated at the proper temperature will combine into crystalline zinc orthosilicate, a fluorescent material similar to willemite, the activating material constituting less than one per cent.

If, during the crushing operation or for any other reason, the fluorescent mineral crystals become rounded off, then in accordance with my invention they must be heated until the fine particles recrystallize into structures with sharp edges.

In practicing the invention, the crystalline fluorescent powder is produced by heating fluorescent salts to a temperature sufficiently high to insure the formation of crystals. Diatomaceous earth, infusorial soil, or pure silica, is united with a suitable base such as zinc oxide, and a suitable activating material such as manganese or the like. The color may be varied by adding other activators such as uranium salts, cerium, vanadium salts, or the like.

Suitable glass tubing or bulbs are thoroughly cleaned and then their inside surfaces are frosted by sand-blasting or by treatment with hydrofluoric acid or fluorides. Clear glass tubing may also be used. The clear or frosted glass is coated with a thin layer of glue or other bonding material, preferably inorganic, such as sodium or other silicate or borate or the like.

A fine powder of the crystalline fluorescent salts is sprayed onto the glue, care being taken to prevent coating of the salt crystals with glue. Finally, the tubing is heated to cause the salt crystals firmly to adhere thereto. The coated surface will be covered with fine, sharp crystals of fluorescent material. The uncoated exposed sharp crystalline edges will reflect, deflect and transform cathode rays, ultra-violet rays and the like, into visible rays by setting up fluorescence.

When an alkaline silicate such as sodium silicate is used as a bonding material, I may dispense with the excess of alkaline material after the tube has been sprayed and heated, by washing the tubing with a concentrated solution of ammonium chloride, and then permitting it to dry. This removes the excess of alkaline materials and causes the materials to adhere firmly to the glass.

The color of the fluorescent tubing depends mainly upon the type of activating material used, although the type of tube, gas filling and electrodes employed, are also important factors.

The operation of coating the inside of the tubing may be carried out by floating a fine dust of the crystalline fluorescent salts against the glass surface coated with an alkaline silicate bonding material.

It may also be carried out in an automatic machine on which the etched or clear tubing is placed after cleaning, and which then combines the operation of coating or spraying the inside with a silicate solution, then floating or spraying the crystalline powders against the moist silicate and then baking so as to produce a uniform frosting throughout the bulb or length of tubing.

Another alternative is to spray an emulsion of silicate solution and crystalline fluorescent powders against the inner wall of the glass, bake the same onto the glass, and then treat the coating with a concentrated ammonium chloride solution which will decompose the excess of alkaline silicate and remove the same from the exterior surface of the fluorescent powders so that they may react as such with the activating rays. After the ammonium chloride treatment, the inside surface is washed with pure water either cold or hot, and the surface dried and baked. By this means a uniformly coated inside surface is produced.

What I claim is:

1. The process of making fluorescent glass envelopes for lamps which comprises heating fluorescent salts until they form into sharp-edged crystals, frosting the inside surface of the glass envelope, coating the frosted surface with sodium silicate, spraying the salt crystals on the sodium silicate coating so that they will adhere to the glass but will not be coated by the sodium silicate, heating the coated envelope until the salt crystals become firmly bonded thereto, washing the coating with a concentrated solution of ammonium chloride, washing with water, and finally drying and baking.

2. The process of producing inside coated, clear or frosted tubing and bulbs, by spraying clean tubing or bulbs with an emulsion of an inorganic bonding solution such as sodium silicate and a crystalline fluorescent salt with sharp edges, baking said spray onto the glass, then treating said spray with a solution of ammonium chloride or the like to decompose the excess of alkaline silicate and produce thereby a surface exposing to activating rays the sharp edges of fluorescent salts, washing said surface with water, and baking the same.

3. As a new article of manufacture, a glass envelope for discharge lamps having its inner surface coated with sharp-edged particles of diatomaceous earth saturated with zinc oxide and having less than 1% of an activating agent uniformly distributed therethrough.

4. As a new article of manufacture, a glass envelope for lamps or the like coated on the inside surface with a baked emulsion of a sodium silicate solution and particles of diatomaceous earth saturated with zinc oxide and less than 1% activating material fixed to said inside surface by treatment with ammonium chloride.

5. The process of making fluorescent glass envelopes for lamps or the like, which comprises saturating porous diatomaceous earth with zinc oxide and less than 1% of activating agents by heat treating at temperatures sufficiently high to form same into sharp-edged crystals, powdering same and spraying said powders against the inside surface of said glass envelope having a thin film of sodium silicate so that the powders adhere thereto, heating said sprayed surface until both are thoroughly baked onto the glass, then chemically treating the resultant inside surface with ammonium chloride to frost and fix said components onto the glass and simultaneously decompose excess alkali, and finally washing, drying and baking said glass envelope.

CLEMENS A. LAISE.